(12) United States Patent
Okamoto et al.

(10) Patent No.: US 6,688,125 B2
(45) Date of Patent: Feb. 10, 2004

(54) REFRIGERATING APPARATUS FOR USE IN VEHICLES, USING AN ENGINE AS POWER SOURCE

(75) Inventors: Hiroshi Okamoto, Shizuoka (JP); Yuuichi Ide, Fuji (JP); Masaki Toyoda, Numadu (JP)

(73) Assignee: Toshiba Carrier Corporation, Tokyo (JP)

(*) Notice: Subject to any disclaimer, the term of this patent is extended or adjusted under 35 U.S.C. 154(b) by 0 days.

(21) Appl. No.: 10/320,366

(22) Filed: Dec. 17, 2002

(65) Prior Publication Data
US 2003/0106332 A1 Jun. 12, 2003

Related U.S. Application Data

(63) Continuation of application No. PCT/JP01/05516, filed on Jun. 27, 2001.

(30) Foreign Application Priority Data

Jun. 28, 2000 (JP) .......................... 2000-195150
Apr. 27, 2001 (JP) .......................... 2001-133494

(51) Int. Cl.[7] .............................................. B60H 1/32
(52) U.S. Cl. ............................................ 62/239; 62/244
(58) Field of Search .......................... 62/239, 244, 231, 62/236, 323.1

(56) References Cited

U.S. PATENT DOCUMENTS

| 4,354,144 | A | * | 10/1982 | McCarthy ................. 180/65 B |
| 5,469,816 | A | * | 11/1995 | Murakawa et al. ............. 123/2 |
| 5,942,818 | A | * | 8/1999 | Satoh et al. ................... 310/46 |
| 5,984,034 | A | * | 11/1999 | Morisawa et al. ......... 180/65.2 |
| 6,020,697 | A | * | 2/2000 | Shimasaki et al. ......... 180/65.4 |
| 6,119,799 | A | * | 9/2000 | Morisawa et al. ......... 180/65.2 |
| 6,251,046 | B1 | * | 6/2001 | Yoshino et al. ............. 477/187 |
| 6,453,249 | B1 | * | 9/2002 | Shibutani et al. ............. 702/63 |
| 6,457,351 | B1 | * | 10/2002 | Yamamoto .................... 73/116 |

FOREIGN PATENT DOCUMENTS

| EP | 0841208 A1 | * | 5/1998 |
| JP | 411125328 A | * | 5/1999 |
| JP | 2000-111226 | | 4/2000 |

* cited by examiner

*Primary Examiner*—William E. Tapolcai
*Assistant Examiner*—Mohammad M. Ali
(74) *Attorney, Agent, or Firm*—Pillsbury Winthrop LLP

(57) ABSTRACT

The engine drives the generator, which generates electric power. The power drives the compressor. Thus driven, the compressor cools the interior of the refrigerating chamber. When the engine stops, the output of the generator stops is no longer available. Then, the compressor is automatically driven by the power of the storage battery unit.

20 Claims, 9 Drawing Sheets

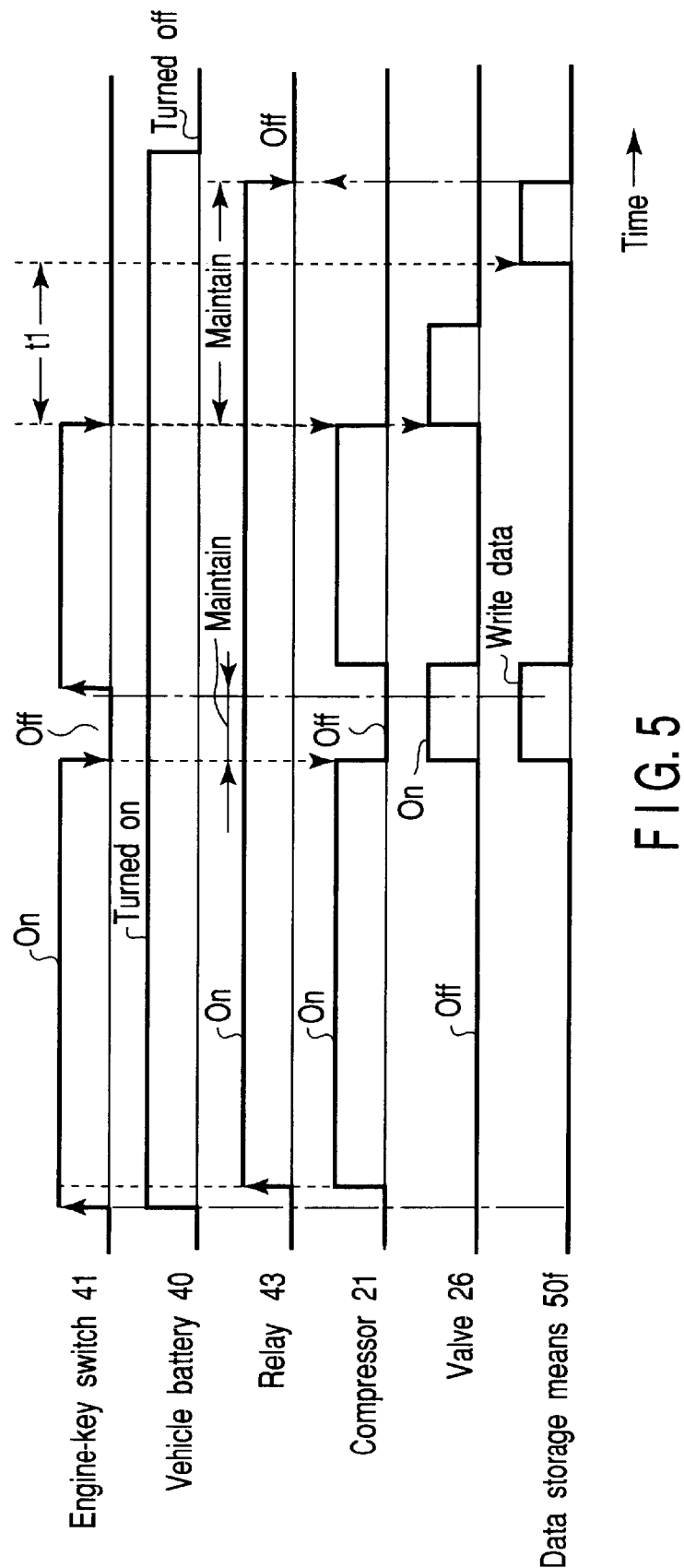
F I G. 5

REFRIGERATING APPARATUS FOR USE IN VEHICLES, USING AN ENGINE AS POWER SOURCE

CROSS-REFERENCE TO RELATED APPLICATIONS

This is a Continuation Application of PCT Application No. PCT/JP01/05516, filed Jun. 27, 2001, which was not published under PCT Article 21(2) in English.

This application is based upon and claims the benefit of priority from the prior Japanese Patent Applications No. 2000-195150, filed Jun. 28, 2000; and No. 2001-133494, Apr. 27, 2001, the entire contents of both of which are incorporated herein by reference.

BACKGROUND OF THE INVENTION

1. Field of the Invention

This invention relates to a refrigerating apparatus for use in vehicles that starts and stops repeatedly and frequently, like home-delivery vans.

2. Description of the Related Art

An example of a refrigerating apparatus for use in refrigerating cars is disclosed in, for example, Japanese Patent Application No. 11-85993. This refrigerating apparatus comprises a compressor and a storage battery. The compressor is driven by power generated by a generator driven by the engine on vehicles, power externally supplied from a commercial power supply, or power supplied from the storage battery.

The compressor is driven by the output of the generator while the car is running and the refrigerating apparatus is operating in the normal refrigeration mode. The compressor is driven by the power externally supplied from the commercial power supply, while the car remains stopped and the refrigerating apparatus is operating in the preliminary cooling mode (i.e., standby mode) to cool the interior of the refrigerating chamber. The compressor is driven by the power supplied from the storage battery, while the car is temporarily stopped during delivery service and the refrigerating apparatus operates in the temporal refrigeration mode (i.e., idling-stop mode).

If such a refrigerating apparatus for use in vehicles is provided in a refrigerating car that starts and stops repeatedly and frequently, like home-delivery vans, the following problems will arise.

The user (i.e., driver) must manually operate the refrigerating apparatus in the temporal refrigeration mode (i.e., idling-stop mode) while in the temporary refrigeration mode (i.e., idling-stop mode). The manual operation is performed each time the engine is stopped. To perform this operation is therefore cumbersome and greatly troublesome for the user. If the user leaves the car without carrying out this manual operation, the refrigerating apparatus will not be operated in the temporal refrigeration mode. In this case, the temperature in the refrigerating chamber will inevitably rise.

BRIEF SUMMARY OF THE INVENTION

The present invention has bee made in consideration of the foregoing. An object of the invention is to provide a refrigerating apparatus which can appropriately operate at all times, not being influenced by the conditions in which the vehicle incorporating it is driven and or imposing much labor on the driver of the vehicle, and which excels in reliability, not causing troubles such as a temperature rise in the refrigerating chamber.

A refrigerating apparatus according to the invention is designed for use in vehicles that use an engine as power source. The refrigerating apparatus comprises:

a refrigerating cycle having a compressor, a condenser and an evaporator, in which refrigerant discharged from the compressor is circulated through the condenser and the evaporator;

a generator which is driven by the engine;

a storage battery unit which is recharged with an output of the generator;

an inverter which converts electric power supplied from the generator or the storage battery unit, to power for driving the compressor; and a controller which has first control means for supplying the output of the generator to the inverter, second control means for supplying power from the storage battery unit to the inverter, third control means for supplying the output of the generator to the inverter and supplying power from the storage battery unit to the inverter when no power is thereafter available from the generator, and fourth control means for selectively controlling these control means.

BRIEF DESCRIPTION OF THE SEVERAL VIEWS OF THE DRAWING

FIG. 5 is a timing chart explaining the self-maintaining of the system controller provided in each embodiment;

DETAILED DESCRIPTION OF THE INVENTION

[1] The first embodiment of this invention will be described, with reference to the accompanying drawings.

Figure 1:
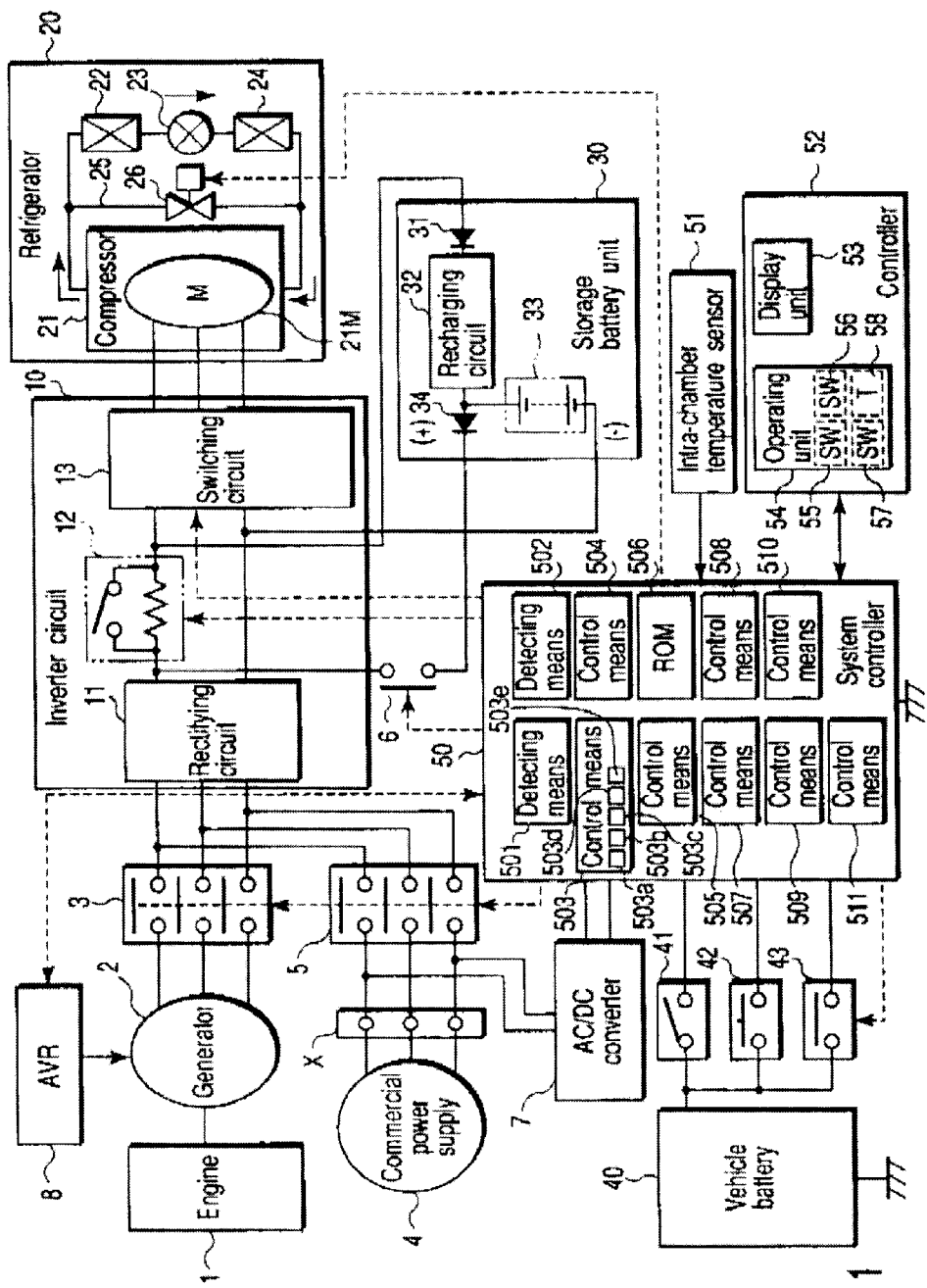
FIG. 1 is a block diagram showing the structure of a first embodiment of the invention.

As FIG. 1 shows, a generator 2 is coupled with a belt or the like to the engine 1 that is the power source provided in a refrigerating car. The power of the engine 1 drives the generator 2, which generates alternating-current power (e.g., three-phase voltage of 220V). The output terminal of the generator 2 is connected to an inverter 10. An electromagnetic switch (first switch) 3 is provided on the current path between the generator 2 and the inverter 10.

A commercial power supply 4 (so-called "city power source facility"), which is an external power supply, is provided at a prescribed position. It can be used, whenever necessary. The commercial power supply 4 can be connected to, and disconnected from, connection terminals X. The terminals X are connected to the inverter 10. An electromagnetic switch (second switch) 5 is provided on the current path between the connection terminals X and the inverter 10.

The inverter 10 comprises a rectifying circuit 11, a switching circuit 13, and an inrush-current inhibition circuit 12. The rectifying circuit 11 rectifies the output of the generator 2 and the power of the commercial power supply 4. The switching circuit 13 is connected to the output terminals of the rectifying circuit 11. The inrush-current inhibition circuit 12 is provided on the current path between the rectifying circuit 11 and the switching circuit 13.

A storage battery unit 30 is connected to the output terminals of the rectifying circuit 11 via the inrush-current inhibition circuit 12. The storage battery unit 30 has a backflow-preventing diode 31, a recharging circuit 32, a storage battery (storage-type power supply) 33, and a backflow-preventing diode 34. The storage battery 33 is recharged with the output voltage of the rectifying circuit 11, through the backflow-preventing diode 31 and recharging circuit 32. The output voltage (e.g., DC 240 V) of the storage battery 33 is applied by discharging via the backflow-preventing diode 34. The power discharged is supplied to the switching circuit 13 through the inrush-current inhibition circuit 12. A relay contact (third switch) 6 is provided on the current path for this discharged power.

The switching circuit 13 has a plurality of switching elements. The switching elements are turned on or off in accordance with an instruction supplied from a system controller 50, which will be described later. Thus, the switching circuit 13 converts either the output of the rectifying circuit 11 or the discharged output of the storage battery unit 30, into an alternating-current power having a frequency F (Hz) that is desirable for the system controller 50. This power is output as drive power for the compressor motor 21M that is incorporated in the refrigerator 20.

The refrigerator 20 has a refrigerating cycle. The refrigerating cycle comprises a compressor 21, an outdoor heat exchanger (condenser) 22, an expansion valve 23, and an intra-chamber heat exchanger (evaporator) 24, which are connected with pipes. The compressor 21 compresses refrigerant and discharges the refrigerant. The refrigerant discharged flows through the outdoor heat exchanger 22. The refrigerant flows from the heat exchanger 22 into the expansion valve 23, which is a reducer. The refrigerant flows from the expansion valve 23 into the intra-chamber heat exchanger 24. The refrigerant is then fed back into the compressor 21. The intra-chamber heat exchanger is provided in the refrigerating chamber 64, which will be described later. It cools the interior of the refrigerating chamber 64.

A bypass pipe 25 connects the high-pressure pipe and low-pressure pipe of the refrigerating cycle. A valve 26 is provided on the bypass pipe 25 to balance the refrigerant pressures at the high-pressure and low-pressure sides.

An AC/DC converter 7 is connected to the connection terminals X. The converter 7 receives the alternating-current voltage from the commercial power supply 4 and converts the voltage to a direct-current voltage of a prescribed level. The AC/DC converter 7 outputs a drive voltage to the system controller 50. It functions as power supply to the controller.

An automatic voltage regulator (AVR) 8 is connected to the generator 2. The automatic voltage regulator 8 adjusts the output voltage of the generator 2 to a predetermined value (e.g., three-phase 220V) even if the rotational speed of the compressor motor 21M, or the load of the generator 2, changes (that is, even if the load changes). The automatic voltage regulator 8 is connected to the system controller 50 via a signal line, too.

The system controller 50 is connected to the vehicle battery 40 provided in the refrigerating car (i.e., power supply of storage type), via an engine-key switch (first operation switch) 41, an idling-stop switch (second operation switch) 42 and a relay contact (normally open contact) 43 each. The vehicle battery 40 is the power supply in the electric system of the refrigerating car. Nonetheless, it is used as power supply for controllers and provides a drive voltage to the system controller 50, as well. The engine-key switch 41 is a manual switch to start and stop the engine 1. The idling-stop switch 42 is a push-button switch (a normally open contact of automatic reset type). When the switch 42 is pushed, power is supplied from the storage battery unit 30 to the refrigerator 20 while the engine 1 remains stopped and the commercial power supply 4 remains disconnected.

An intra-chamber temperature sensor 51 and a controller 52 are connected to the system controller 50. The sensor 51 detects the temperature in the refrigerating chamber 64 that will be described later. The controller 52 has a display unit 53 and an operating unit 54. The operating unit 54 comprises an operating switch 55, an automatic-mode switch 56, a recharging-mode switch 57, and a temperature-setting dial 58. When operated, the automatic-mode switch 56 sets or resets automatic mode, which will be explained later. When operated, the recharging-mode switch 57 sets or resets recharging mode for recharging the storage battery unit 30. The temperature-setting dial 58 is rotated to set a desirable intra-chamber temperature.

The refrigerating apparatus for use in refrigerating cars, according to this embodiment, can be operated in generator-driving mode, commercial power mode, idling-stop mode, automatic mode, and recharging mode.

In the generator-driving mode, the engine 1 drives the generator 2, the output of the generator 2 is supplied to the inverter 10, and the compressor 21 is thereby driven.

In the commercial power mode, power, if supplied from the commercial power supply 4 to the connection terminals X, is input to the inverter 10 in order to drive the compressor 21.

In the idling-stop mode, power is supplied from the storage battery unit 30 to the inverter 10 for a preset time ta when the idling-stop switch 42 is depressed, while the generator 2 is generating no power and the commercial power supply 4 is supplying no power to the connection terminals X.

In the automatic mode, the apparatus is first operated in either the generator-driving mode or the commercial power mode, and is then automatically switched to the idling-stop mode. The automatic mode can be selected when the automatic-mode switch 56 is turned on in the operating unit 54 of the controller 52.

The system controller 50 has the following means (1) to (11) as major components:

(1) Detecting means 501 for detecting whether the generator 2 is generating power, by using the automatic voltage regulator 8.

(2) Detecting means 502 for detecting whether power is supplied from the commercial power supply 4 to the connection terminals X, in accordance with whether the AC/DC converter 7 is applying a direct-current voltage.

(3) Control means 503 for controlling the electromagnetic switches 3 and 5 and a relay contact 6, in accordance with the outputs of the detecting means 501 and 502 and the operation of the idling-stop switch 42.

The control means 503 has the following functions 503a, 503b, 503c, 503d, 503e and 503f to perform.

The function 503a (first control means, eleventh control means) is to operate the refrigerating apparatus in the generator-driving mode. The electromagnetic switch 3 is closed and the electromagnetic switch 5 and the relay contact 6 are opened, supplying the output of the generator 2 to the inverter 10, when the engine-key switch 41 is on and no power is supplied from the commercial power supply 4.

The function 503b (thirteenth control means) is to operate the refrigerating apparatus in the commercial power mode. It is determined that the commercial power supply 4 should be used prior to any other power supply, when the engine-key switch 41 is on and power is available from the commercial power supply 4. The relay contact 6 is opened, supplying power to the inverter 10 from the commercial power supply 4.

The function 503c (thirteenth control means) is to operate the refrigerating apparatus in the commercial power mode. The electromagnetic switch 5 is closed and the electromagnetic switch 3 and the relay contact 6 are opened, supplying power to the inverter 10 from the commercial power supply 4, when the engine-key switch 41 is off and power is available from the commercial power supply 4.

The function 503d (second control means, twelfth control means) is to operate the refrigerating apparatus in the idling-stop mode. The relay contact 6 is closed and the electromagnetic switches 3 and 5 are opened, supplying power from the storage battery unit 30 to the inverter 10, when the idling-stop switch 42 is pushed while the engine-key switch 41 remains off and no power is therefore available from the generator 2 and no power is being supplied from the commercial power supply 4. Upon lapse of the preset time ta from the start of supplying the power, the relay contact 6 is opened, thus stopping the supply of power from the storage battery unit 30 to the inverter 10.

The function 503e (third control means, thirteenth control means) is to operate the refrigerating apparatus in the automatic mode while the automatic-mode switch 56 remains on. That is, the electromagnetic switch 3 and relay contact 6 are closed and the switch 5 is opened, supplying power from the generator 2 to the inverter 10, when the engine-key switch 41 is on, power is available from the generator 2, and no power is available from the commercial power supply 4. When power becomes no longer available from the generator 2 thereafter, the relay contact 6 is maintained closed (the electromagnetic switch 3 is opened), thus supplying power from the storage battery unit 30 to the inverter 10. When the function 503e is performed, the relay contact 6 is opened upon lapse of the preset time to from the start of supplying power from the storage battery unit 30 to the inverter 10. The supply of power from the storage battery unit 30 to the inverter 10 is therefore stopped. In short, the function 503e is to operate the refrigerating apparatus first in the generator-driving mode, the operating mode automatically then changes to the idling-stop mode when the refrigerating apparatus stops operating in the generator-driving mode.

The function 503f (fifteenth control means) is to operate refrigerating apparatus in the automatic mode when the automatic-mode switch 56 is on. That is, the electromagnetic switch 5 and the relay contact 6 are closed and the electromagnetic switch 3 is opened, supplying power from the commercial power supply 4 to the inverter 10 when the engine-key switch 41 is off and no output of the generator 2 is available and the power is available from the commercial power supply 4, the relay contact 6 is maintained closed (the electromagnetic switch 5 is opened), thus supplying power from the storage battery unit 30 to the inverter 10. When the function 503f is performed, the relay contact 6 is opened, stopping the supply of power from the storage battery unit 30 to the inverter 10, upon lapse of the preset time ta after the start of the supply of power from the storage battery unit 30 to the inverter 10. In brief, the function 503f is to operate the apparatus in the commercial mode to the idling-stop mode when the commercial mode operation is terminated.

When the function 503a is performed, the electromagnetic switch 3 is closed and the electromagnetic switch 5 and the relay contact 6 are opened. Nonetheless, the control program may be changed to close electromagnetic switch 3 and the relay contact 6 and open the electromagnetic switch 5. In this case, the power of the storage battery unit 30 can make up for the insufficiency of power supply to the inverter 10, which occurs when the rotational speed of the engine 1 falls, decreasing the output of the generator 2. Namely, the storage battery unit 30 is utilized as a backup power supply for the generator 2.

When the function 503b is performed, the commercial power supply 4 is used prior to any other power supply, operating the refrigerating apparatus in the commercial power mode. Nonetheless, the control program may be changed to operate the apparatus in the generator-driving mode, thus using the generator 2 prior to any other power supply.

(4) Control means 504 for controlling controls the switching circuit 13 in accordance with the temperature detected by the intra-chamber temperature sensor 51 and for controlling the output voltage V and output frequency F of the switching circuit 13.

The control means 504 has the following functions 504a and 504b to perform.

The function 504a is performed to switch the pattern (V/F pattern) of controlling the output voltage V (V) and output frequency F of the switching circuit 13 in accordance with whether the power supplied to the inverter 10 comes from the generator 2, the commercial power supply 4, or the storage battery unit 30.

The function 504b is performed to change the output frequency F of the inverter 10 more quickly when the inverter 10 receives power from the generator 2 than when the inverter 10 receives power from the commercial power supply 4 or the storage battery unit 30.

(5) Control means 505 (fifth control means, seventeenth control means) that operates when supplied with power from the vehicle battery 40 through the engine-key switch 41 as the switch 41 is closed, or when supplied with power from the AC/DC converter 7 while the commercial power supply 4 is connected to the connection terminals X, to close the relay contact 43 and thus form a power-supplying path for supplying power from the vehicle battery 40 to the system controller 50 and to maintain this power-supplying path (formed by closing the relay contact 43) until a preset time t1 elapses after the apparatus finishes operating in the generator-driving mode, commercial power mode, idling-stop mode or automatic mode.

(6) Nonvolatile data storage unit (ROM) 506.

(7) Control means 507 (sixth control means, eighteenth control means) for storing the control data that the system controller 50 has used to perform a control, into the data storage unit 506 when the preset time t1 elapses in the control means 505.

(8) Control means 508 (seventh control means, nineteenth control means) that opens the valve 26 for the preset time t1 during which the control means 505 operates, thus performing a pressure control to balance the high coolant pressure and low coolant pressure in the refrigerating cycle.

(9) Control means 509 that lowers the output frequency F of the inverter 10 to a predetermined value F1, in spite of the control performed by the control means 504, when the source of the power supplied to the inverter 10 is switched.

(10) Control means 510 that changes the output voltage V of the inverter 10, step by step, when the control means 509 lowers the output frequency F of the switching circuit 13, thereby to maintain the output frequency of the switching circuit 13 at the prescribed value F1 mentioned above, in spite changed the control pattern of the control means 504.

(11) Control means 511 that stops the switching circuit 13 when the recharging-mode switch 57 is operated to set the recharging mode, while either the switch 3 or the switch 5 remains closed, thereby to perform operation in the recharging mode to use the output of the rectifying circuit 11 only to recharge the storage battery unit 30.

Figure 2:
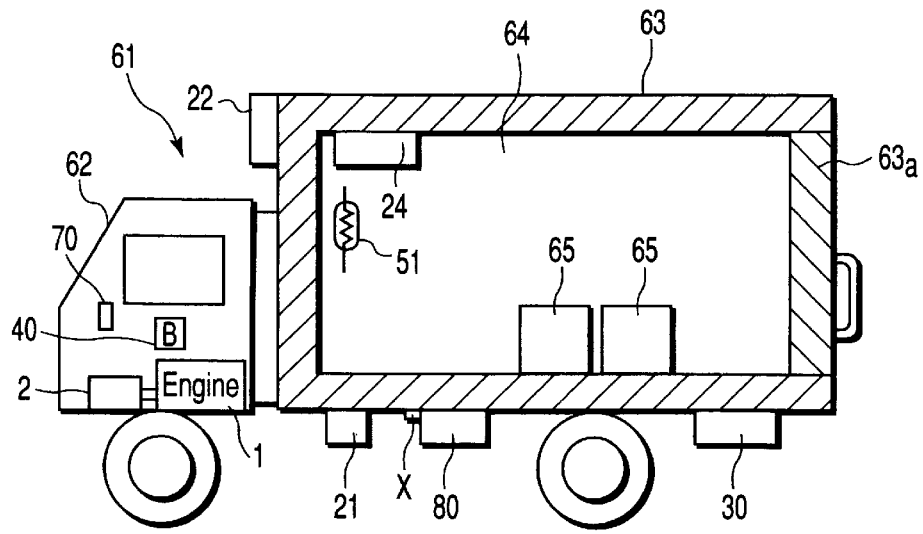
FIG. 2 is a diagram illustrating the refrigerating chamber of a refrigerating car that incorporates the first embodiment.

FIG. 2 shows a refrigerating car that incorporates a refrigerating apparatus of the structure described above.

The refrigerating car 61 comprises a driver's room 62 and a container 63. The container 63 has a refrigerating chamber 64. Wile the back door 63a of the refrigerating chamber 64 remains open, perishable foods 65 can be stored into and taken from the refrigerating chamber 64. The intra-chamber heat exchanger 24 and the intra-chamber temperature sensor 51 are provided in the refrigerating chamber 64.

An operation unit 70 is provided at the driver's room 62. The operating unit 70 has the engine-key switch 41, idling-stop switch 42, controller 52 and the like, all described above.

Below the driver's room 62 is an engine room, in which the engine 1, the generator 2, the vehicle battery 40, and the like are provided.

The above-mentioned outdoor heat exchanger 22 is mounted on the container 63 and exposed to wind that the refrigerating car receives while running. On the bottom of the container 63 there are arranged the compressor 21, the storage battery unit 30, an electric circuit unit 80, the connection terminals X, and the like. The electric circuit unit 80 contains the switches 3 and 5, relay contact 6, AC/DC converter 7, inverter 10, relay contact 43, the system controller 50, and the like.

How the refrigerating apparatus operates will be explained.

(a) Basic Operation

How the refrigerating apparatus operates in the generator-driving mode will be explained first.

When the engine-key switch 41 is turned on, the engine 1 starts to drive the generator 2. At the same time, a voltage (e.g., DC 24 V) is applied from the vehicle battery 40 to the system controller 50 through the engine-key switch 41. The system controller 50 therefore starts operating.

The system controller 50 operates with the power supplied from the vehicle battery 40 through the engine-key switch 41. The relay contact 43 remains closed so that the system controller 50 may operate even after the refrigerating apparatus stops operating in the generator-driving mode.

When the operation switch 55 of the controller 52 is turned on, the system controller 50 sends an operation command to the automatic voltage regulator (AVR) 8. The generator 2 therefore starts operating. The automatic voltage regulator 8 supplies a signal to the system controller 50, said signal indicating that the generator 2 has started operating. From the signal it receives from the automatic voltage regulator 8, the system controller 50 determines that the generator 2 has started operating. The controller 50 closes the electromagnetic switch 3.

When the electromagnetic switch 3 is closed, the power generated by the generator 2 is supplied to the inverter 10. Thus, the compressor 21 can be driven, and the recharging of the storage battery unit 30 is started.

The intra-chamber temperature sensor 51 detects the temperature Tr in the refrigerating chamber 64. The temperature Tr detected is compared with the target temperature set by turning the temperature-setting dial 58. If the result of comparison satisfies the cooling condition (for example, if Tr>target temperature), the switching circuit 13 is driven. The output of the switching circuit 13 drives the compressor 21. Thus driven, the compressor 21 discharges the refrigerant. The refrigerant flows through the outdoor heat exchanger 22, expansion valve 23 and intra-chamber heat exchanger 24 and returns into the compressor 21. The intra-chamber heat exchanger 24 functions as evaporator as the refrigerant flows through it. The chamber 24 therefore cools the air in the refrigerating chamber 64.

After the start of the compressor 21, the output frequency of the switching circuit 13 is controlled in accordance with the difference between the temperature Tr and the target temperature. This changes the rotational speed of the compressor 21. The temperature Tr may lower below, for example, the target temperature. In this case, the switching circuit 13 stops operating, and the compressor 21 stops operating. The cooling is thereby interrupted. When the temperature Tr rises thereafter satisfying the cooling condition, the compressor 21 is driven in the same way as described above.

When the operation switch 55 of the controller 52 is turned on again, the system controller 50 sends a stop command to the automatic voltage regulator 8. The generator 2 is thereby stopped. The automatic voltage regulator 8 transmits a signal to the system controller 50. The signal indicates that the generator 2 has stopped operating. From this signal the system controller 50 determines that the generator 2 has stopped operating and opens the electromagnetic switch 3. When the electromagnetic switch 3 is opened, the refrigerating apparatus stops operating in the generator-driving mode.

When the engine-key switch 41 is turned off, the system controller 50 detects this fact. Upon detecting this fact, the system controller 50 opens the electromagnetic switch 3. When the switch 3 is opened, the operation in the generator-driving mode is terminated.

How the refrigerating apparatus operates in the commercial power mode will be explained.

The connection terminals X may be connected to the commercial power supply 4 after the engine-key switch 41 is turned off, stopping the supply of power to the generator 2. In this case, power is supplied from the commercial power supply 4 to the AC/DC converter 7. The AC/DC converter 7 supplies the power to the system controller 50. The system controller 50 therefore starts operating. Receiving power from the AC/DC converter 7, the system controller 50 determines that the commercial power supply 4 is connected to the connection terminals X. Then, the system controller 50 closes the electromagnetic switch 5 when the operation switch 55 of the controller 52 is turned on.

Note that the system controller 50 operates while receiving power from the AC/DC converter 7. Nonetheless, the relay contact 43 remains closed so that the system controller 50 may operate even after the refrigerating apparatus stops operating in the commercial power mode.

When the electromagnetic switch 5 is closed, power is supplied from the commercial power supply 4 to the inverter 10. Now that power is supplied to the inverter 10, it is possible to drive the compressor 21 and the recharging of the storage battery unit 30 is started. If the result of comparison between the target temperature and the temperature Tr detected by the intra-chamber temperature sensor 51 satisfies the cooling condition, the switching circuit 13 is driven. The output of the switching circuit 13 drives the compressor 21. The compressor 21 discharges the refrigerant. The refrigerant flows through the outdoor heat exchanger 22, expansion valve 23 and intra-chamber heat exchanger 24 and returns into the compressor 21. As the refrigerant so flows, the intra-chamber heat exchanger 24 works as evaporator. Thus, the intra-chamber heat exchanger 24 serves to cool the air in the refrigerating chamber 64.

After the compressor 21 starts operating, the output frequency of the switching circuit 13 is controlled in accordance with the difference between the temperature Tr and the target temperature. This changes the rotational speed of the compressor 21. When the temperature Tr falls below, for example, the target temperature, the switching circuit 13 stops operating, stopping the compressor 21. Hence, the cooling is interrupted. When the temperature Tr rises, satisfying the cooling condition again, the compressor 21 is driven again in the same manner as indicated above.

When the operation switch 55 of the controller 52 is turned on again, the system controller 50 opens the electromagnetic switch 5. As the switch 5 is opened, the refrigerating apparatus stops operating in the commercial power mode.

When the commercial power supply 4 is disconnected from the connection terminals X, the system controller 50 detects this fact via the AC/DC converter 7. Upon detecting this fact, the controller 50 opens the electromagnetic switch 5. When the electromagnetic switch 5 is opened, the refrigerating apparatus stops operating in the commercial power mode.

How the refrigerating apparatus operates in the idling-stop mode will be described.

Assume that the engine-key switch 41 has been turned off, the engine 2 therefore generates no power (engine 2 has been stopped), and the connection terminals X remains not connected to the commercial power supply 4. The idling-stop switch 42 may be pushed and closed. Then, power is supplied from the vehicle battery 40 to the system controller 50 via the idling-stop switch 42. The system controller 50 therefore starts operating.

The system controller 50 keeps operating even if the idling-stop switch 42 is opened. Therefore, the relay contact 43 is maintained in closed state so that the controller 50 may continue to operate even after the refrigerating apparatus stops operating in the idling-stop mode.

When the operation switch 55 of the controller 52 is turned on, the relay contact 6 is closed. When the relay contact 6 is closed, the storage battery unit 30 is discharged, supplying power to the inverter 10. The discharge power can drive the compressor 21. When the result of the comparison between the target temperature and the temperature Tr detected by the intra-chamber temperature sensor 51 satisfies the cooling condition, the switching circuit 13 is driven. The output of the switching circuit 13 drives the compressor 21. Thus driven, the compressor 21 discharges the refrigerant. The refrigerant flows through the outdoor heat exchanger 22, expansion valve 23 and intra-chamber heat exchanger 24 and flows back into the compressor 21. At this time the intra-chamber heat exchanger 24 acts as evaporator. The intra-chamber heat exchanger 24 cools the air in the refrigerating chamber 64.

After the compressor 21 is activated, the difference between the temperature Tr detected and the target temperature controls the output frequency of the switching circuit 13. This changes the rotational speed of the compressor 21. When the temperature Tr detected falls below, for example, the target temperature, the switching circuit 13 is stopped. The compressor 21 therefore stops operating. The cooling is thereby interrupted. When the temperature Tr detected thereafter rises and the cooling condition is satisfied again, the compressor 21 is activated in the same way as described above.

The relay contact 6 is opened upon lapse of the preset time ta from the start of the idling-stop mode operation. When the replay contact 6 is opened, the supply of power from the storage battery unit 30 to the inverter 10 is interrupted. This causes the refrigerating apparatus to stop operating in the idling-stop mode.

Figure 3:
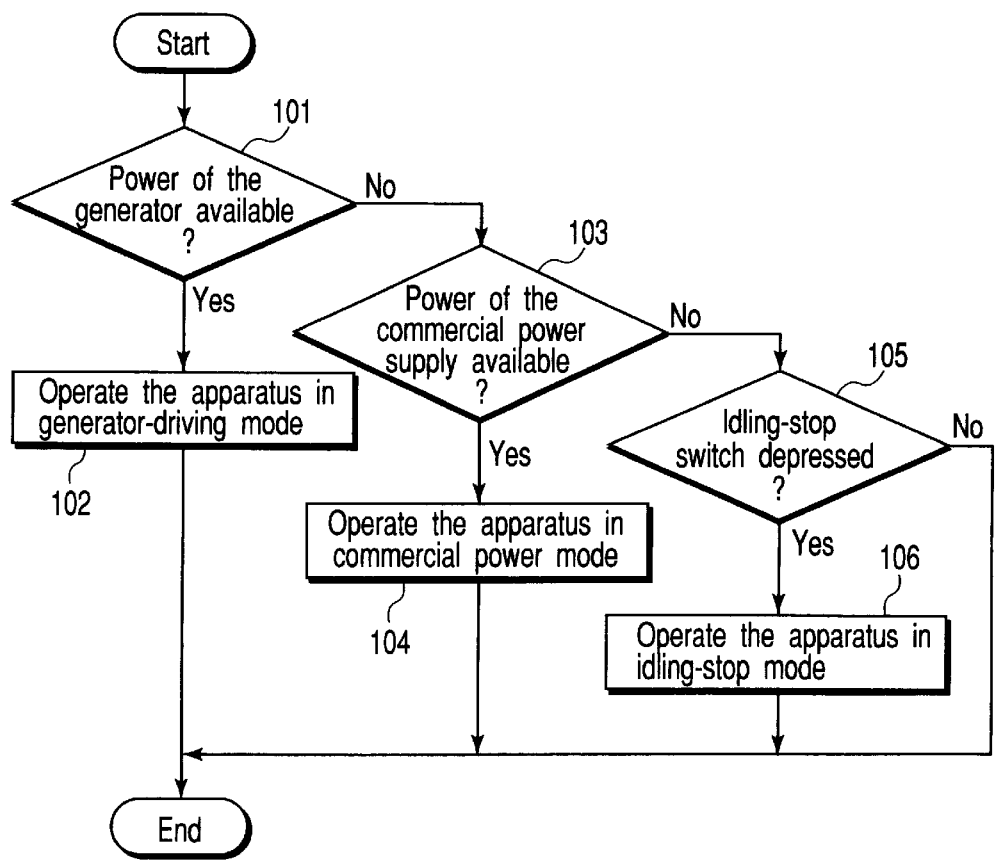
FIG. 3 is a flowchart explaining the basic operation of the first embodiment.

As the flowchart of FIG. 3 shows, the generator 2 may output power (YES at Step 101). In this case, only the electromagnetic switch 3 is closed, and the refrigerating apparatus operates in the generator-driving mode (Step 102). If the generator 2 generates no power (NO at Step 101) and if power is available from the commercial power supply 4 (YES at Step 103), only the electromagnetic switch 5 is closed, and the refrigerating apparatus operates in the commercial power mode (Step 104). The generator 2 may output no power (NO at Step 101) and no power may be available from the commercial power supply 4 (NO at Step 103). If the idling-stop switch 42 is pushed in this condition (YES at Step 105), only the relay contact 6 is closed, and the refrigerating apparatus operates in the idling-stop mode (Step 106).

That is, the generator 2, the commercial power supply 4, or the storage battery unit 30 is used as power supply for the compressor 21. Basically, the generator 2 is used while the refrigerating car is running (while the engine 1 is being driven); the commercial power supply 4 is used while the car remains parked and the commercial power supply 4 can therefore be utilized; and the storage battery unit 30 is used when the generator 2 outputs no power because the engine 1 is stopped and no power is available from the commercial power supply 4.

Figure 4:
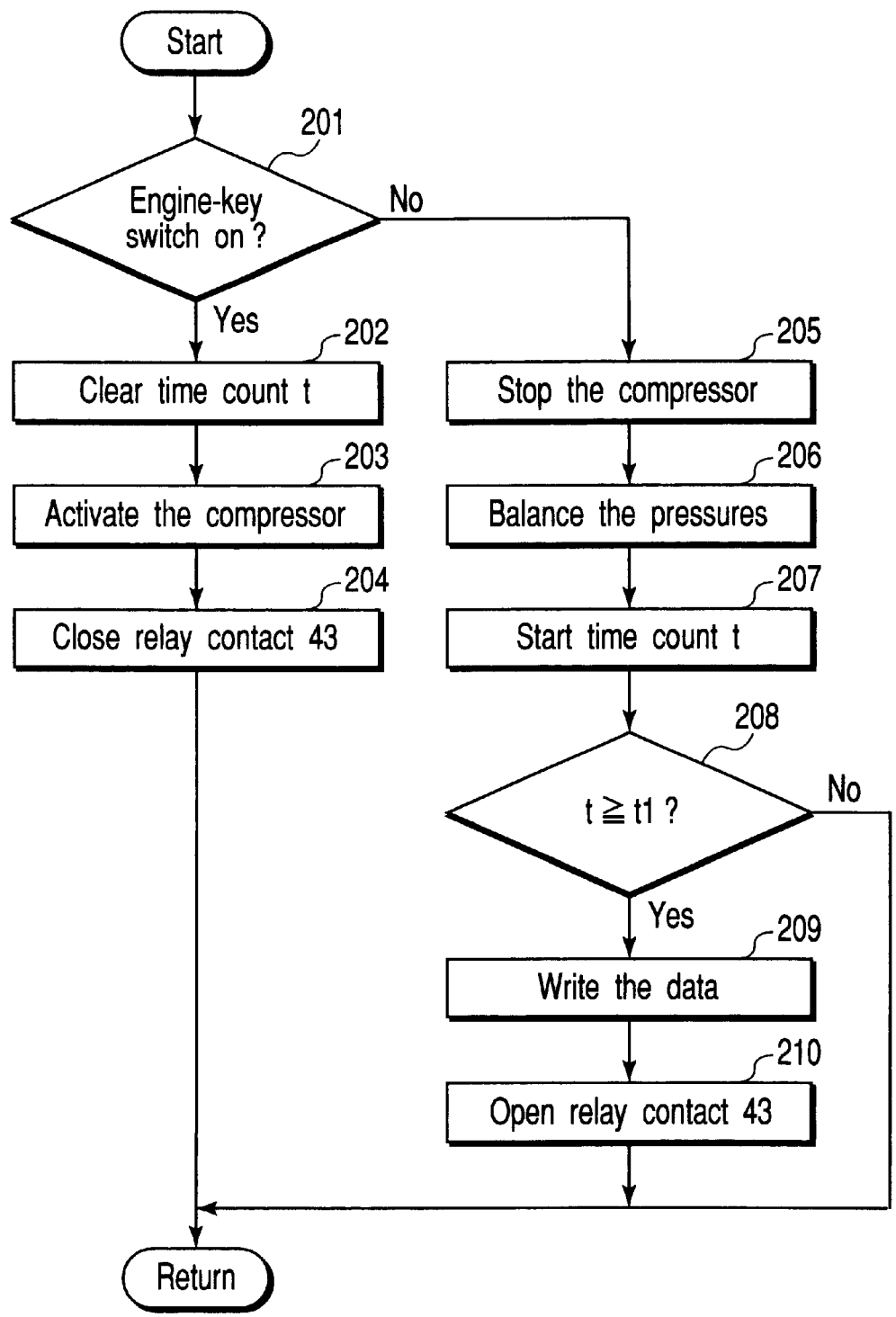
FIG. 4 is a flowchart explaining the self-maintaining of the system controller provided in each embodiment of the invention.

(b) The self-maintaining of the voltage for driving the system controller 50 will be described, with reference to the flowchart of FIG. 4 and the timing chart of FIG. 5. More precisely, how the voltage is maintained in the generator-driving mode will be explained below. In the commercial power mode and the idling-stop mode, the voltage is maintained in basically the same way. The voltage is maintained as will be described below if the automatic-mode switch 56 has been operated to nullify the automatic mode.

When the engine-key switch 41 is turned on (YES at Step 201), the vehicle battery 40 applies an operating voltage to the system controller 50 through the engine-key switch 41. The system controller 50 therefore starts operating. At this time the time count t is cleared in the system controller 50 (Step 202), the compressor 21 is activated (Step 203), and the relay contact 43 is closed (Step 204).

When the engine-key switch 41 is turned off (NO at Step 201), the supply of power to the system controller 50 via the engine-key switch 41 is terminated. In this case, however, the vehicle battery 40 keeps applying the operating voltage to the system controller 50 since the relay contact 43 remains closed. The moment the engine-key switch 41 is turned off, the compressor 21 is stopped (Step 205). The valve 26 provided on the bypass pipe 25 of the refrigerating cycle is opened for a predetermined time (about 30 to 180 seconds). Thus, the refrigerant on the high-pressure and low-pressure sides flows through the bypass pipe 25, balancing the refrigerant pressures at the high- and low-pressure sides, decreasing the difference between these refrigerant pressures (Step 206). When the refrigerant pressures are thus balanced, the time count is started (Step 207). The time count t is compared with the preset time t1 (e.g., about 5 to 30 minutes) (Step 208). Since the refrigerant pressures at the high- and low-pressure sides are balanced in this manner, the refrigerating efficiency rises smoothly and quickly when the compressor 21 is activated next time.

If the engine-key switch 41 is turned on before the time count t reaches the preset time t1 (NO at Step 208 and YES at Step 201), the time count t is cleared (Step 202). In this case, the compressor 21 is activated again (Step 203). At this time, the valve 26 is closed, the pressure-balance finishes performing its function.

When the time count t reaches the preset time t1 (YES at Step 208), the control data (operation history data and the like) about the control the system controller 50 has been performed is written into the data storage unit (ROM) 506 (Step 209). When this data is completely written, the relay contact 43 is opened (Step 210).

When the relay contact 43 is opened, the supply of power from the vehicle battery 40 to the system controller 50. The system controller 50 therefore stops operating.

The preset time t1 for which the system controller 50 maintains the operating voltage can be varied in accordance with the conditions in which it has been driven. It has such a value that the application of operating voltage to the system controller 50 is not frequently interrupted. The number of times the supply of operating voltage may be interrupted each day is given as follows, if the data storage unit 506 has a lifetime of 10 years and if control data is written into the unit 506 at most 0.1 million times.

[0.1 million times/(10 years×365 days)]=27 times/day

The time t1 is preset at a value that can satisfy this frequency, times/day. To achieve the highest possible operating efficiency of the refrigerator 20, it would be best if the supply of operating voltage were not interrupted at all.

The power supply for accomplishing the self-maintaining of voltage is not limited to the vehicle battery 40. Rather, the storage battery unit 30 may be used instead. Alternatively, a dedicated power supply (a storage battery, a capacitor, or the like) may be utilized.

The timing of closing the relay contact 43 to initiate the self-maintaining of voltage is not limited the time when the engine-key switch 41 is turned off. The relay contact 43 may be closed when it is detected that the generator 2 generates no output.

Thus, the system controller 50 can optimally control the supply of its own operating voltage.

Hence, the refrigerant pressures on the high-pressure and low-pressure sides are balanced whenever the refrigerator 20 is activated again even if the refrigerator 20 is operated while the refrigerating car starts and stops repeatedly and frequently. Additionally, the control data has already been written whenever the refrigerator 20 is activated again, regardless of the amount of the control data.

Since the refrigerant pressures on the high-pressure and low-pressure sides are balanced whenever the refrigerator 20 is activated again, the operation of the refrigerating apparatus can be prevented from being interrupted until the refrigerator 20 is activated next time and, in addition, the refrigerating efficiency rises smoothly and quickly.

When the compressor 21 starts operating again, the control data has already been written. This greatly enhances the reliability of the analysis of the operation history.

Since the system controller 50 maintains the operating voltage for the preset time t1, it is possible to prevent an excessive discharge of the vehicle battery 40. Further, the deterioration of the data storage unit 506 can be prevented, because the time t1 has been preset in accordance with the lifetime of the data storage unit 506 and the number of times data can be written into the unit 506.

(c) The automatic mode will be explained.

The refrigerating apparatus operates in the automatic mode when the automatic-mode switch 56 is on.

When the engine-key switch 41 is turned off (the engine is stopped) while the refrigerating apparatus is operating, the compressor 21 is stopped and a stop command is supplied to the automatic voltage regulator 8. As a result, the generator 2 stops operating, the electromagnetic switch 3 is opened, and the relay contact 6 is closed. The operating mode is automatically switched to idling-stop mode that uses the power of the storage battery unit 30.

The preset time ta (for example, 5 minutes) may lapses from the start of the idling-stop mode operation, with the engine-key switch 41 remaining off (the engine and generator remaining stopped) and the commercial power supply 4 disconnected from the connection terminals X. In this case, the inverter 10 stops operating, the relay contact 6 is opened. The refrigerating apparatus therefore stops operating in the automatic mode. Upon lapse of the preset time t1 thereafter, with the engine-key switch 41 remains off (the engine and generator remaining stopped) and the commercial power supply 4 disconnected from the connection terminals X, the control data is written into the unit 506 of the system controller 50. Then, the relay contact 43 is opened. The system controller 50 stops operating.

The engine-key switch 41 may be turned on (the engine and generator start) or the commercial power supply 4 may be connected to the terminals X while the refrigerating apparatus is operating in the idling-stop mode. If this is the case, the operating mode is switched back to either the generator-driving mode or the commercial power mode.

The engine-key switch 41 may be turned on (the engine and generator may start operating) or the commercial power supply 4 may be connected to the terminals X before the preset time t1 elapses from the end of the idling-stop mode operation. In this case, the operating mode is switched back to either the generator-driving mode or the commercial power mode, without opening the relay contact 43 (without stopping the system controller 50).

As indicated above, the compressor 21 is stopped for some time when the operating mode is changed from the generator-driving mode (or commercial power mode) to the idling-stop mode. While the compressor 21 remains stopped, the refrigerating efficiency falls. This decrease of the refrigerating efficiency is not negligibly small. The average refrigerating efficiency cannot have a desired value since the refrigerating car starts and stops repeatedly and frequently. The temperature in the refrigerating chamber noticeably rises every time the back door 63*a* of the refrigerating chamber 64 is opened and closed. If it is necessary to enhance the pull-down performance, the compressor 21 is made to keep operating when the operating mode is switched from the generator-driving mode (or commercial power mode) to the idling-stop mode, as is illustrated in the flowchart of FIG. 6 and the timing chart of FIG. 7.

Figure 6:
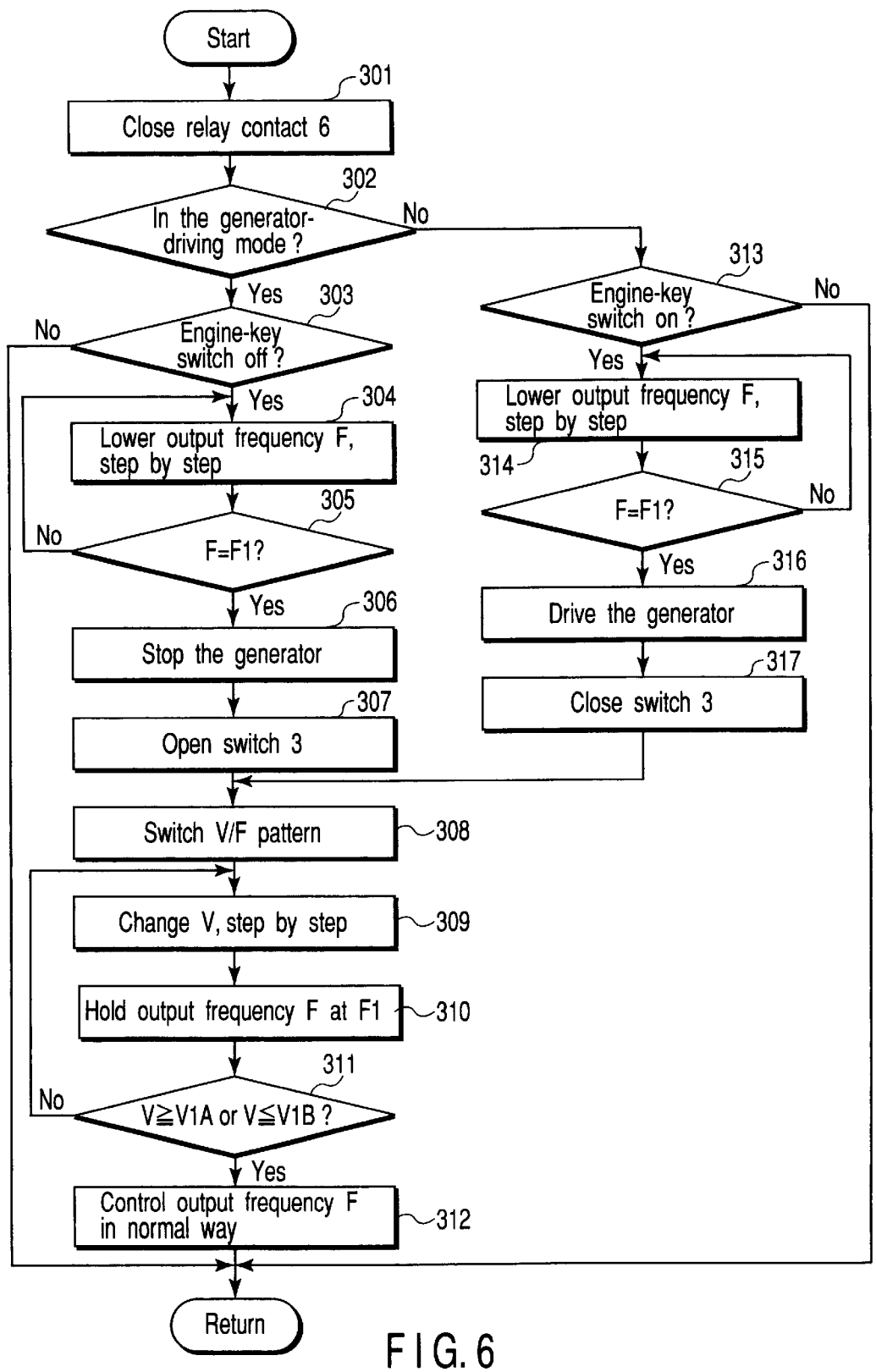
FIG. 6 is a flowchart explaining how each embodiment operates in the automatic mode.
Figure 7:
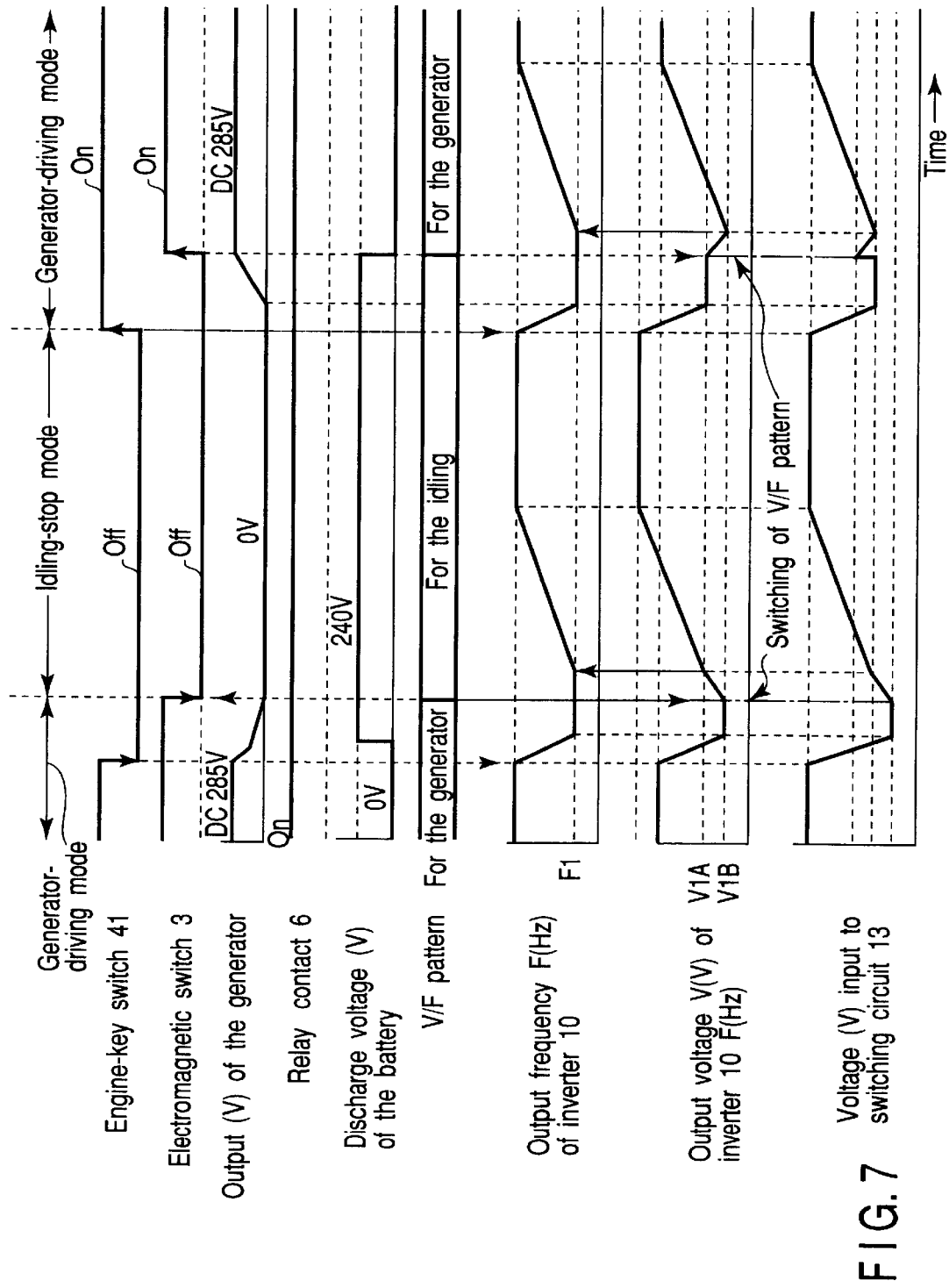
FIG. 7 is a timing chart explaining how each embodiment operates in the automatic mode.

FIGS. 6 and 7 illustrate how the pattern (V/F pattern) of controlling the output voltage V and output frequency F of the switching circuit 13 is switched while the compressor 21 is continuously operating, in order to change the operating mode, from the generator-driving mode (or commercial power mode) to the idling-stop mode.

First, the relay contact 6 is closed (Step 301). The generator 2 generates power in the generator-driving mode, even after the relay contact 6 has been closed. Therefore, the storage battery unit 30 is not discharged.

While the refrigerating apparatus is operating in the generator-driving mode (YES at Step 302), the engine-key switch 41 may be turned off (YES at Step 303). In this case, the output frequency F of the inverter 10 is decreased, step by step, to the prescribed value F1 (Step 304). The rate of decreasing the output frequency F may be 60 Hz/sec that is higher than 1 Hz/sec, or the rate applied in normal control. In this case, the engine 2 stops and the generator 2 outputs no power. The storage battery unit 30 is therefore discharged, supplying power. This power drives the compressor 21, which keeps operating. Thus, the operating mode automatically changes from the generator-driving mode to the idling-stop mode.

When the operating frequency F reaches the prescribed value F1 (YES at Step 305), a stop command is sent to the automatic voltage regulator 8. The generator 2 stops operating (Step 306) and the electromagnetic switch 3 is opened (Step 307). Immediately after the electromagnetic switch 3 is opened, the pattern (V/F pattern) of controlling the output voltage V and frequency F of the switching circuit 13 is switched from the pattern for the generator-driving mode to the pattern for the idling-stop mode (Step 308).

When the operating mode is switched from the generator-driving mode to the idling-stop mode, the voltage input to the switching circuit 13 falls from DC 285 V which is the output voltage of the rectifying circuit 11, to DC 240 V which is the output voltage of the storage battery unit 30. To attain a stable output from the inverter circuit 13 in spite of this voltage decrease, the pattern of controlling the output voltage V and frequency F of the switching circuit 13 is switched.

As the control pattern is switched, the output frequency F may not stop at prescribed value F1, falling below the value F1. If this happens, the compressor 21 will be unnecessarily stopped. To prevent the compressor 21 from stopping' the output voltage V of the switching circuit 13 is raised, step by step, toward a preset value V1A when the pattern of controlling the switching circuit 13 is switched (Step 309). As the output voltage V is thus raised, the output frequency of the switching circuit 13 is maintained at the prescribed value F1 (Step 310). When the output voltage V reaches the preset value V1A (YES at Step 311), the output frequency F is controlled in normal way (Step 312).

After the operating mode is changed from the generator-driving mode to the idling-stop mode (NO at Step 302), the engine-key switch 41 may be turned on (thus staring the engine) (YES at Step 313). If this in the case, the output frequency F of the switching circuit 13 is decreased step by step (Step 314). The rate at which the output frequency F falls may be set at 60 Hz/sec that is higher than 1 Hz/sec, or the rate applied in normal control.

When the output frequency F reaches the prescribed value F1 (YES at Step 315), an operation command is sent to the automatic voltage regulator 8, whereby the generator 2 is driven (Step 316). Further, the electromagnetic switch 3 is closed (Step 317). As a result, the operating mode changes from the idling-stop mode, back to the generator-driving mode.

Right after the electromagnetic switch 3 is opened, the pattern (i.e., V/F pattern) of controlling the output voltage V and frequency F of the switching circuit 13 is changed from the pattern for the idling-stop mode, back to the pattern for the generator-driving mode (Step 308).

When the operating mode is switched from the idling-stop mode to the generator-driving mode, the voltage applied to the switching circuit 13 rises from DC 240 V generated by the storage battery unit 30, to the DC 285 V output from the rectifying circuit 11. In order to attain a stable output from the inverter circuit 13 in spite of this voltage increase, the pattern of controlling the output voltage V and frequency F of the switching circuit 13 is switched.

As the control pattern is switched, however, the output frequency F rises, not stopping at the prescribed value F1. To prevent this, the output voltage V of the switching circuit 13 is decreased, step by step, toward a preset value V1B when the pattern of controlling the switching circuit 13 is switched (Step 309). As the output voltage V falls, the output frequency of the switching circuit 13 is maintained at the prescribed value F1 (Step 310). When the output voltage V reaches the preset value V1B (YES at Step 311), the control of the output frequency F is resumed (Step 312).

Thus, the operating mode is automatically switched, from the generator-driving mode to the idling-stop mode, or vise versa, thereby driving the compressor 21 continuously, when the engine-key switch 41 is operated to start or stop the engine 1.

Hence, the user, either the driver nor the driver's assistant, need not to do anything for the operation of the refrigerating apparatus, even when the refrigerating car is frequently started and stopped during the delivery service. This not only reduces the work load on the part of the user, but also enhances the average refrigerating efficiency and the pull-down performance (fast freezing). Further, this minimizes the temperature rise that occurs in the refrigerating chamber 64 every time the back door 63*a* of the refrigerating chamber 64 is opened and closed. Moreover, this prevents unnecessary stop of the compressor 21. The refrigerating apparatus is therefore a reliable one for use in vehicles.

(d) How the refrigerating apparatus operates in the idling-stop mode will be explained.

The driver may push the idling-stop switch 42 while the engine-key switch 41 remains off, the generator 2 therefore generates no power, and the commercial power supply 4 remains disconnected from the connection terminals X. In this case, the vehicle battery 40 supplies a voltage to the system controller 50 through the idling-stop switch 42. The system controller 50 is therefore activated. The idling-stop switch 42 is turned off the moment the user stops pressing it. Nevertheless, the system controller 50 keeps operating because the relay contact 43 remains closed, supplying power to the system controller 50. Namely, the system controller 50 is self-maintained (backed up).

When the idling-stop switch 42 is pushed, the system controller 50 closes the discharge relay contact 6. The discharge power of the storage battery unit 30 is therefor supplied to the inverter 10. The system controller 50 also controls the operating frequency F. Thus, the refrigerating apparatus starts operating in the idling-stop mode.

After the idling-stop mode operation starts, the preset time ta may elapse, with the engine-key switch 41 remaining off and the commercial power supply 4 remaining disconnected from the connection terminals X. If this is the case, the switching circuit 13 is stopped and the discharge relay contact 6 is opened. The idling-stop mode operation is therefore terminated. When the preset time t1 elapses thereafter, with the engine-key switch still remaining off and the commercial power supply 4 still remaining disconnected, the system controller 50 writes control data into the data storage unit 506, said control data showing the controls performed thus far. The system controller 50 then opens the relay contact 43 and terminates the self-maintaining.

The engine-key switch 41 may be turned on or the commercial power supply 4 may be connected to the connection terminals X while the refrigerating apparatus is operating in the idling-stop mode. In this case, the idling-stop mode operation is interrupted. The refrigerating apparatus starts operating in either the generator-driving mode or the commercial power mode.

Before the preset time t1 elapses from the end of the idling-stop mode operation, the engine-key switch 41 may be turned on or the commercial power supply 4 may be connected. In this case, the refrigerating apparatus starts operating in the generator-driving mode or the commercial power mode, without opening the relay contact 43.

The number of times the idling-stop mode operation is continuously performed may be limited for the purpose of preventing excessive discharging of the storage buttery unit 30.

As specified above, the idling-stop switch 42 is provided for initiating the idling-stop mode operation, in addition to the controller 52. Refrigerating can therefore be carried out the very moment the driver thinks it necessary to start the refrigeration. Appropriate measures can be taken, for example when preliminary cooling must be effected in the refrigerating chamber 64 or when the refrigerating car is parked at lunchtime.

(e) It will be described how the automatic mode operation (switching of the operating mode, from the generator-driving mode or the commercial power mode to the idling-stop mode) and the idling-stop mode operation started by pushing the idling-stop switch 42 can be performed at the same time.

The idling-stop switch 42 may be depressed while the refrigerating apparatus is operating in an automatic mode, i.e., either the generator-driving mode or the commercial power mode. If this is the case, the generator-driving mode operation or the commercial power mode operation is terminated and the idling-stop mode operation is performed prior to operation of any other operating mode. Upon lapse of the preset time ta from the start of the idling-stop mode operation, the idling-stop mode operation is terminated. When the preset time t1 elapses thereafter, the control data representing the control performed thus far is written into the data storage unit 506. The relay contact 43 is opened, stopping the system controller 50.

(f) How to save power of the storage battery unit 30 in the idling-stop mode operation will be explained, with reference to the flowchart of FIG. 8.

While the compressor 21 is operating, the output frequency F of the switching circuit 13 is determined by the difference between the temperature Tr detected by the intra-chamber temperature sensor 51 and the target temperature preset by turning the temperature-setting dial 58. When the temperature T1 detected falls below the target temperature, the compressor 21 is stopped. When the temperature Tr detected rises above the target temperature, the compressor 21 is started again.

The temperature in the refrigerating chamber 64 may be raised to some extent during the idling-stop mode operation. In this case, the target temperature can be set at a greater value than in the generator-driving mode or the commercial power mode. Then, the operating efficiency of the compressor 21 can be lowered to save power of the storage battery unit 30.

Figure 8:
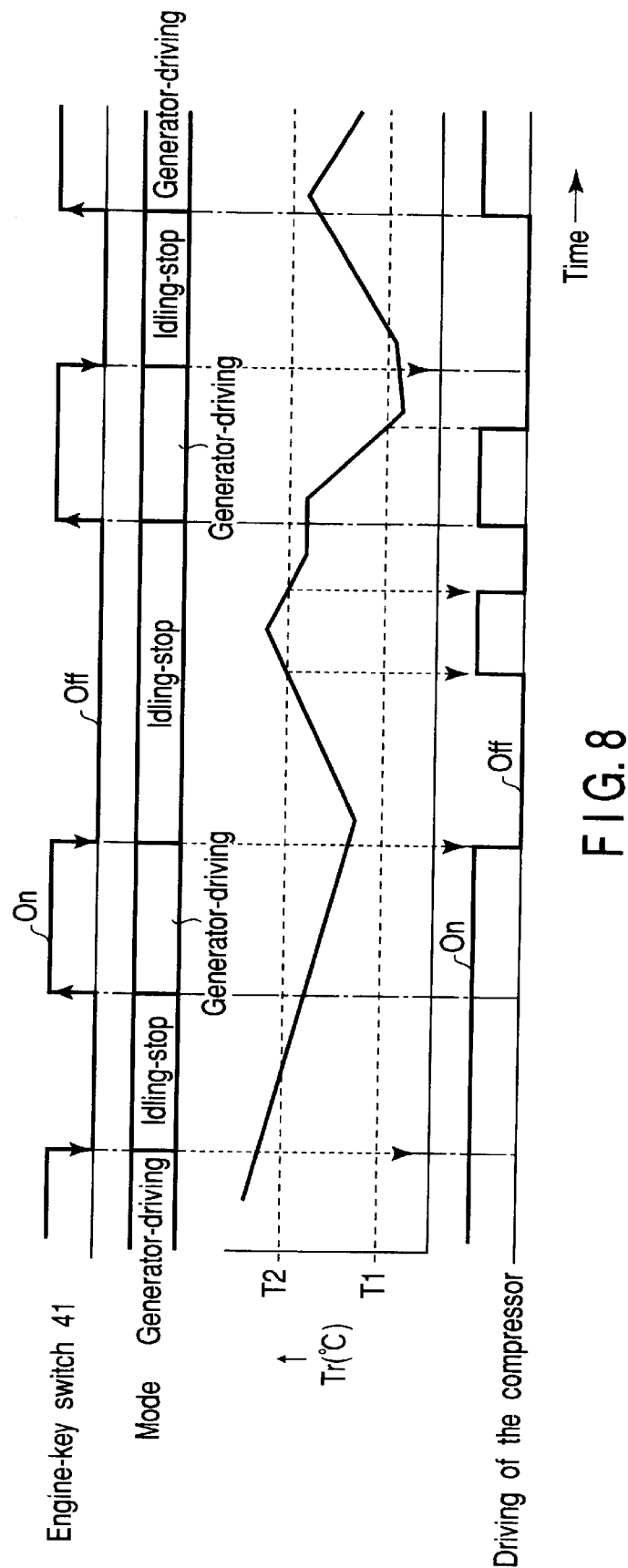
FIG. 8 is a timing chart explaining how the temperature in the chamber is controlled when each embodiment operates in the automatic mode.

The timing chart of FIG. 8 illustrates the automatic mode operation, i.e., switching of the operating mode from the generator-driving mode to the idling-stop mode. While the refrigerating apparatus is operating in the generator-driving mode, the target temperature is set at T1. While the apparatus is operating in the idling-stop mode, the target temperature is set at T2 (>T1). The target temperature T1 is a value set by turning the temperature-setting dial 58. The target temperature T2 is automatically set to be, for example, 5° C. higher than the target temperature T1, when the target temperature T1 is set.

When the engine-key switch 41 is turned off while $Tr \geq T2$ in the generator-driving mode operation, the operating mode shifts to the idling-stop mode, while the compressor 21 is continuously operating. When the engine-key switch 41 is turned on, the operating mode shifts back to the generator-driving mode while the compressor 21 is continuously operating.

The engine-key switch 41 may be turned off while $T1 \leq Tr < T2$ during the generator-driving mode operation. If this is the case, the operating mode changes to the idling-stop mode, with the compressor 21 remains stopped. After the operating mode so shifts, the compressor 21 is started in the condition of $Tr \geq T2$. If the condition of $T1 \leq Tr < T2$ remains after the change of operating mode and the engine-key switch 41 is turned on while the compressor 21 remains stopped, the compressor 21 starts operating and the operating mode shifts back to the generator-driving mode. In this case, the power of the storage battery unit 30 is not consumed at all, provided that the condition of $Tr < T2$ remains unchanged.

Therefore, the intra-chamber temperature can be optimally controlled while saving the power of the storage battery unit 30, even if the unit 30 must have a small storage capacity because of the limitation to the volume, weight and cost of the refrigerating apparatus.

The target temperatures T1 and T2 can be set at any desired value by turning the temperature-setting dial 58 of the controller 52. The user can therefore set any target intra-chamber temperature that is most desirable in view of the kind, package type and use of the goods stored and frozen in the refrigerating chamber 64.

(g) A method of optimizing the preset time t1 for self-maintaining of the system controller 50 will be explained.

The present time t1 may be changed in accordance with the mode of using the refrigerating car.

The refrigerating car may be parked for a short time after the automatic mode operation ends. If so, the preset time t1 must be relatively short, i.e., five minutes.

If the idling-stop switch 42 is pushed, terminating the idling-stop mode operation, it is can be assumed that the driver leaves the refrigerating car for lunch and that the car is parked for a long time. In this case, the preset time t1 is 30 minutes, which is comparatively long.

After the automatic mode operation is stopped by turning off the automatic-mode switch 56 of the controller 52, the time t1 is set to 10 minutes on the assumption that the car will be frequently parked without loading or unloading the cargo.

After the commercial power mode operation is stopped by turning off the automatic-mode switch 56 of the controller 52, the time t1 is set to a smaller value of 2 minutes on the assumption that this operation is stopped because the commercial power supply 4 has failed for a short time.

Since the time t1 is so set, it is possible to prevent the storage buttery unit 30 from being excessively discharged and to minimize the number of times the operating voltage is applied to the system controller 50.

The preset time t1 may be changed by positively operating the controller 52.

(h) It will be described how to terminate the self-maintaining of the system controller 50.

The user may want to stop the self-maintaining of the system controller 50 immediately. Alternatively, he or she may want to delete the history of malfunction from the system controller 50 in order to activate the system again. In either case, the user may operate a release switch provided on the system controller 52 or two or more of the switches provided on the system controller 52, thereby opening the relay contact 43 which would otherwise remain closed.

Then, the refrigerating apparatus can be activated again as is desired when the apparatus stops, by accident, during the use of the refrigerating car. Further, the any power supply can be immediately disconnected from the refrigerating apparatus whenever it is necessary to inspect the apparatus, repair the apparatus or replace parts with new ones to keep the apparatus in good conditions.

(i) The rate of changing the output frequency F of the switching circuit 13 will be explained.

The power source for the inverter 10 may be a static power supply such as the commercial power supply 4 that is stable. If so, about 1 Hz/sec is chosen for the rate of changing the output frequency F.

Since the generator 2 is driven by the engine 1, its output and generating frequency dynamically change in accordance with the acceleration of the refrigerating car. If driven at a low speed, the generator 2 may generate but an insufficient power or may generate but an inadequate torque. In this case, the upper limit of the output frequency F is preset for each rotational speed range of the engine 2.

It is demanded that the refrigerating efficiency be fast raised when the car is accelerated and the generator 2 generates sufficient power. To meet this demand, the rate of changing the output frequency F in the generator-driving mode is increased from the value applied in the commercial power mode or the idling-stop mode. This makes the output frequency well respond to the acceleration and deceleration of the refrigerating car.

The rate of decreasing the output frequency F may be raised, for example, from 1 Hz/sec to 12 Hz/sec. Then, the generator 2 can be prevented from braking down and the engine 1 is prevented from stalling. If the storage battery unit 30 is used as backup power supply for the generator, the power of the storage battery unit 30 can be saved.

If the rate of increasing the operating frequency F is raised from 1 Hz/sec to 2 Hz/sec, the operating frequency F can be increased quickly. Thus, the refrigerating efficiency can be fast enhanced if the car is accelerated, causing the generator to generate a sufficient power.

These effects are prominent, particularly when the refrigerating car is frequently accelerated and decelerated while running in cities or the like.

(j) The recharging mode will be explained below.

The storage battery 33 of the storage battery unit 30 is recharged via the recharging circuit 32 while the compressor 21 is operating, in the generator-driving mode (the engine is operating) or the commercial power mode (the commercial power supply 4 while the remains connected). It is desirable to recharge the storage battery 33 independently, in the case where the apparatus operates more frequently in the idling-stop mode than in the generator-driving mode or the refrigerating apparatus is not used at all.

This is why the controller 52 has the recharging-mode switch 57 that functions as means for setting the apparatus into the recharging mode to recharge the storage battery unit 30.

The recharging-mode switch 57 is turned on when the electromagnetic switch 3 is closed (to drive the generator 2) or when the electromagnetic switch 5 is closed (by connecting the commercial power supply 4). Then, the switching circuit 13 stops operating. The output of the rectifying circuit 11 provided in the inverter 10 is used only to recharge the storage battery 33.

The recharging mode may be selected by causing the controller 52 to perform two or more controls in combination. When the apparatus is operating in the generator-driving mode, a power key, if provided on the controller 52, and the operation switch 55 may be turned on and off, respectively, at the same time, thereby to select the recharging mode. When the apparatus is operating in the commercial power mode, the power key and the operation key 55 are turned off at the same time, thereby to select the recharging mode.

Hence, the storage battery unit 30 can be recharged, not requiring a special recharging unit or a special operation part.

[2] The second embodiment of the invention will be described.

Figure 9:
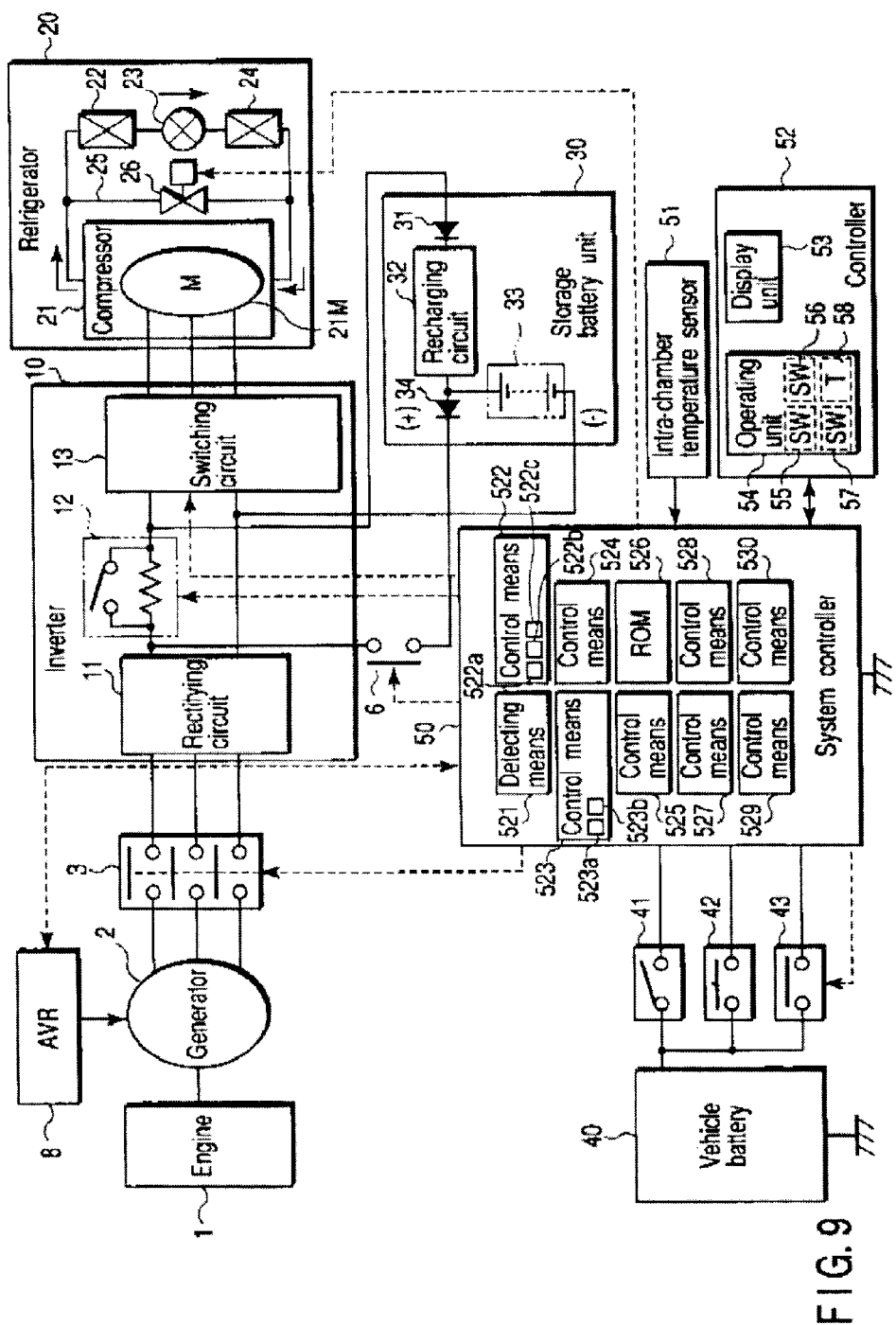
FIG. 9 is a block diagram depicting a second embodiment of the invention.
Figure 10:
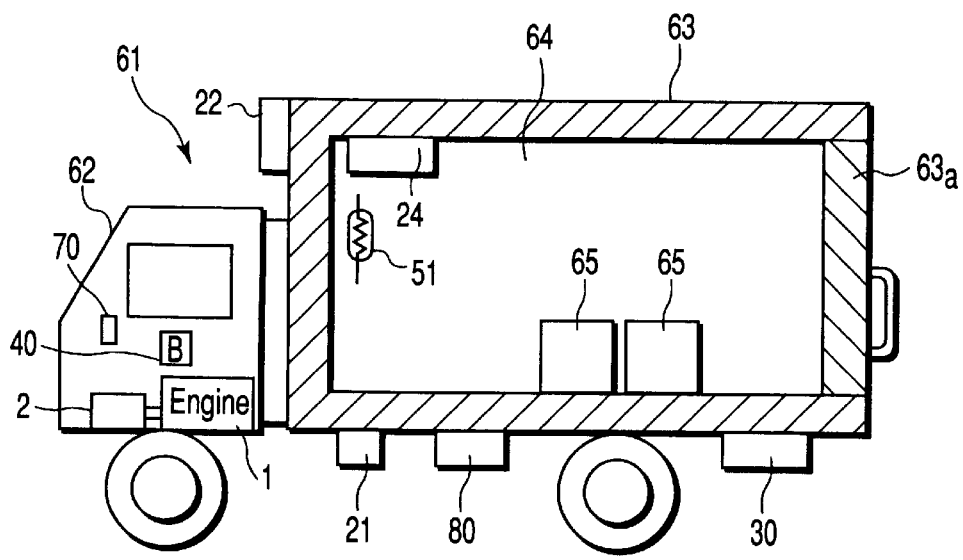
FIG. 10 is a diagram illustrating the refrigerating chamber provided in the second embodiment.

As seen from FIGS. 9 and 10, the second embodiment has no components equivalent to the commercial power supply 4, connection terminals X, electromagnetic switch 5 and AC/DC converter 7.

The system controller 50 has the following means (1) to (10) as major components.

(1) Detecting means 521 for detecting whether the generator 2 is generating power, by using the automatic voltage regulator 8.

(2) Control means 522 (twenty-first control means) for controlling the electromagnetic switch 3 and the relay contact 6, in accordance with the outputs of the detecting means 521 and the operation of the idling-stop switch 42.

The control means 522 has the following functions 522a, 522b and 522c to perform.

The function 522a is to operate the refrigerating apparatus in the generator-driving mode. The electromagnetic switch 3 is closed and the relay contact 6 are opened, supplying the output of the generator 2 to the inverter 10, when the engine-key switch 41 is on and power is supplied from the generator 2.

The function 522b is to operate the refrigerating apparatus in the idling-stop mode. The relay contact 6 is closed and the electromagnetic switch 3 is opened, supplying power from the storage battery unit 30 to the inverter 10, when the idling-stop switch 42 is pushed while the engine-key switch 41 remains off and no power is therefore available from the generator 2. Upon lapse of the preset time ta from the start of supplying the power, the relay contact 6 is opened, thus stopping the supply of power from the storage battery unit 30 to the inverter 10.

The function 522c is to operate refrigerating apparatus in the automatic mode when the automatic-mode switch 56 is on. That is, the electromagnetic switch 3 and the relay contact 6 are closed, supplying the output of the generator 2 to the inverter 10 when the engine-key switch 41 is on and power is available from no output of the generator 2 is available and power is available from the generator 3. When power is no longer available from the generator 2, the relay contact 6 is maintained closed (the electromagnetic switch 3 is opened), thus supplying power from the storage battery unit 30 to the inverter 10. When the function 522c is performed, the relay contact 6 is opened, stopping the supply of power from the storage battery unit 30 to the inverter 10, upon lapse of the preset time to after the start of the supply of power from the storage battery unit 30 to the inverter 10. In short, the function 522c is to operate the apparatus in the generator-driving mode first and then automatically changes the operating mode to the idling-stop mode when the generator-driving operation is terminated.

When the function 522a is performed, the electromagnetic switch 3 is closed and the relay contact 6 is opened. Nonetheless, the control program may be changed to close the electromagnetic switch 3 and the relay contact 6. In this case, the power of the storage battery unit 30 can make up for the insufficiency of power supply to the inverter 10, which occurs when the rotational speed of the engine 1 falls, decreasing the output of the generator 2.

(3) Control means 523 for controlling the switching circuit 13 in accordance with the temperature detected by the intra-chamber temperature sensor 51 and for controlling the output voltage V and output frequency F of the switching circuit 13.

The control means 523 (twenty-second control means) has the following functions 523a and 523b to perform.

The function 523a is performed to switch the pattern (V/F pattern) of controlling the output voltage V (V) and the output frequency F in accordance with whether the power supplied to the inverter 10 comes from the generator 2 or the storage battery unit 30.

The function 523b is performed to change the output frequency F of the inverter 10 more quickly when the inverter 10 receives power from the generator 2 than when the inverter 10 receives power from the commercial power supply 4 or the storage battery unit 30.

(4) Control means 524 (twenty-third control means) that operates when supplied with power from the vehicle battery 40 via the engine-key switch 41 as the switch 41 is closed, to close the relay contact 43 and thus form a power-supplying path for supplying power from the vehicle battery 40 to the system controller 50 and to maintain this power-supplying path (formed by closing the relay contact 43) until a preset time t1 elapses after the apparatus finishes operating in the generator-driving mode, idling-stop mode or automatic mode.

(5) Nonvolatile data storage unit (ROM) 525.

(6) Control means 526 (twenty-fourth control means) for storing the control data that the system controller 50 has used to perform a control, into the data storage unit 525 when the preset time t1 elapses in the control means 524.

(7) Control means 527 (twenty-fifth control means) that opens the valve 26 for the prescribed time t1 during which the control means 524 operates, thus performing a pressure control to balance the high coolant pressure and low coolant pressure in the refrigerating cycle.

(8) Control means 528 (twenty-sixth control means) that lowers the output frequency F of the inverter 10 to a predetermined value F1, in spite of the control performed by the control means 503, when the source of the power supplied to the inverter 10 is switched.

(9) Control means 529 that changes the output voltage V of the inverter 10, step by step, when the control means 528 lowers the output frequency F, thereby to maintain the output frequency of the switching circuit 13 at the prescribed value F1 mentioned above in spite of the switching of the control pattern of the control means 523.

(10) Control means 530 (twenty-eighth control means) that stops the switching circuit 13 when the recharging-mode switch 57 is operated to set the recharging mode, while either the switch 3 or the switch 5 remains closed, thereby to perform operation in the recharging mode to use the output of the rectifying circuit 11 only to recharge the storage battery unit 30.

Figure 11:
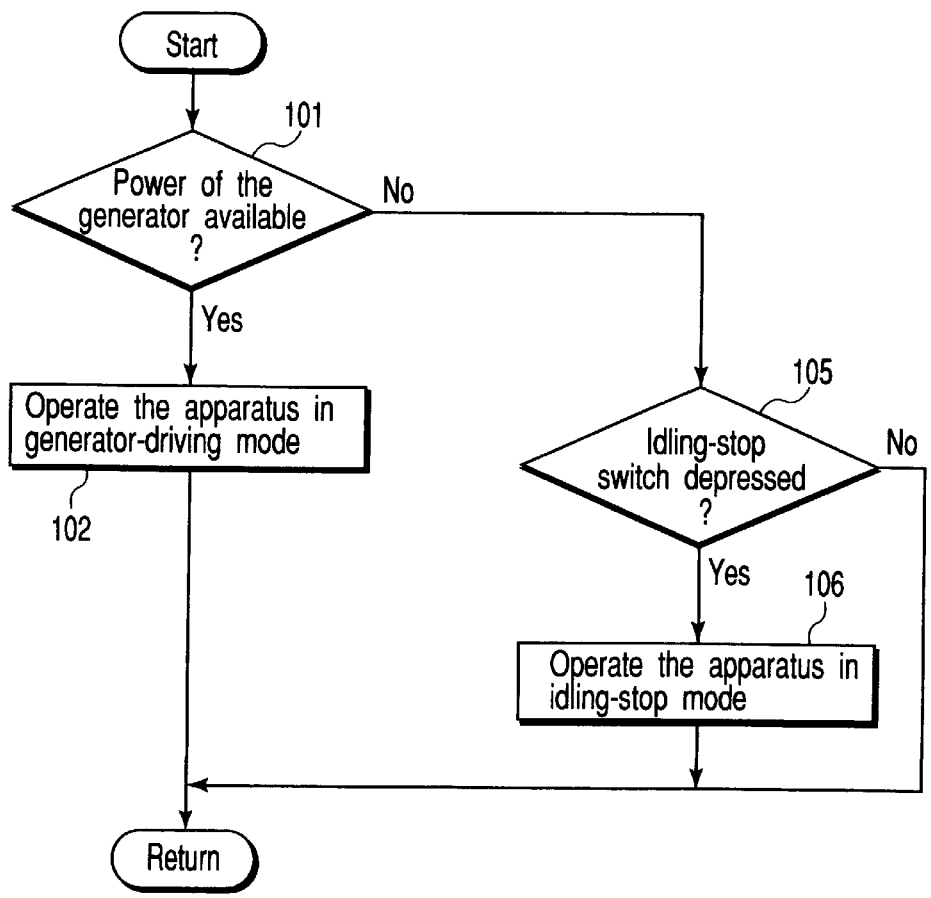
FIG. 11 is a flowchart explaining the basic operation of the first embodiment.

The second embodiment carries out its basic operation as shown in FIG. 11. When the generator 2 outputs power (YES at Step 101), only the electromagnetic switch 3 is closed, thus performing the generator-driving mode operation (Step 102). When the generator 2 outputs no power (NO at Step 101) and the idling-stop switch 42 is pushed (YES at Step 105), only the relay contact 6 is closed. In this case, the idling-stop mode operation is carried out (Step 106).

Thus, two power supplies, i.e., the generator 2 and the storage battery unit 30 are interchangeably utilized to drive the compressor 21. Basically, the generator 2 is used while the refrigerating car is running (while the engine 1 is operating). When no power is obtained from the generator 2, the storage battery unit 30 is utilized.

The second embodiment is identical to the first embodiment, except that the commercial power supply 4 and the components associated therewith are not provided. Therefore, the second embodiment will not be described in detail.

The present invention is not limited to the embodiments described above. Various changes and modifications can be made, without changing the gist of the invention.

The present invention can be applied not only to refrigerating cars for delivery service, but also to any vehicles that has a refrigerating chamber.

What is claimed is:

1. A refrigerating apparatus for use in vehicles that use an engine as power source, said apparatus comprising:
    a refrigerating cycle having a compressor, a condenser and an evaporator, in which refrigerant discharged from the compressor is circulated through the condenser and the evaporator;
    a generator which is driven by the engine:
        a storage battery unit which is recharged with an output of the generator;
        an inverter for converting electric power supplied from the generator and the storage battery unit, to power for driving the compressor; and
        a controller which has first control means for supplying the output of the generator to the inverter, second control means for supplying power from the storage battery unit to the inverter, and third control means for supplying the output of the generator to the inverter and supplying power from the storage battery unit to the inverter when no power is thereafter available from the generator.

2. An apparatus according to claim 1, further comprising a power supply for the controller, which outputs power necessary for driving the controller.

3. An apparatus according to claim 2, wherein the controller further has fifth control means which forms a power-supplying path for supplying power from the power supply to the controller and which maintains the power-supplying path until a preset time elapses after the first, second and third control means perform controls.

4. An apparatus according to claim 2, wherein the controller further has a nonvolatile data storage unit, fifth control means and sixth control means, the fifth control means forms a power-supplying path for supplying power from the power supply to the controller and maintains the power-supplying path until a preset time elapses after the first, second and third control means perform controls, and the sixth control means stores control data about the control that the controller has performed, into the nonvolatile data storage unit.

5. An apparatus according to claim 2, wherein the controller further has a nonvolatile data storage unit, fifth control means and seventh control means, the fifth control means forms a power-supplying path for supplying power from the power supply to the controller and maintains the power-supplying path until a preset time elapses after the first, second and third control means perform controls, and the seventh control means performs pressure-balancing control during the preset time to balance refrigerant pressures at high- and low-pressure sides of the refrigerating cycle.

6. An apparatus according to claim 2, wherein the power supply for the controller is a vehicle batter or the storage battery unit.

7. A refrigerating apparatus for use in vehicles that use an engine as power source, said apparatus comprising:
    a refrigerating cycle having a compressor, a condenser and an evaporator, in which refrigerant discharged from the compressor is circulated through the condenser and the evaporator;
    a generator which is driven by the engine;
    a storage battery unit which is recharged with an output of the generator;
    a connection terminal that can be connected to a commercial power supply;
    an inverter for converting electric power supplied from the generator, the storage battery unit and the connection terminal, to power for driving the compressor; and
    a controller which has eleventh control means for supplying the output of the generator to the inverter, twelfth control means for supplying power from the storage battery unit to the inverter, thirteenth control means for supplying the power from the connection terminal to the inverter, fourteenth control means for supplying the output of the generator to the inverter and supplying power from the storage battery unit to the inverter when no power is thereafter available from the generator, and fifteenth control means for supplying the power from the connection terminal to the inverter and supplying power from the storage battery unit to the inverter when power is no longer supplied to the connection terminal.

8. An apparatus according to claim 7, further comprising a power supply for the controller, which outputs power necessary for driving the controller.

9. An apparatus according to claim 8, wherein the controller further has seventeenth control means which forms a power-supplying path for supplying power from the power supply to the controller and which maintains the power-supplying path until a preset time elapses after the eleventh, twelfth, thirteenth, fourteenth and fifteenth control means perform controls.

10. An apparatus according to claim 8, wherein the controller further has a nonvolatile data storage unit, seventeenth control means and eighteenth control means, the seventeenth control means forms a power-supplying path for supplying power from the power supply to the controller and maintains the power-supplying path until a preset time elapses after the eleventh, twelfth, thirteenth, fourteenth and fifteenth control means perform controls, and the eighteenth control means stores control data about the control that the controller has performed, into the nonvolatile data storage unit.

11. An apparatus according to claim 8, wherein the controller further has a nonvolatile data storage unit, seventeenth control means and nineteen control means, the seventeenth control means forms a power-supplying path for supplying power from the power supply to the controller and maintains the power-supplying path until a preset time elapses after the eleventh, twelfth, thirteenth, fourteenth and fifteenth control means perform controls, and the nineteenth control means performs pressure-balancing control during the preset time to balance refrigerant pressures at high- and low-pressure sides of the refrigerating cycle.

12. An apparatus according to claim 8, wherein the power supply for the controller is a vehicle battery or the storage battery unit.

13. A refrigerating apparatus for use in vehicles that has an engine and refrigerating chamber, designed to cool the interior of the refrigerating chamber, said apparatus comprising:
    a refrigerating cycle having a compressor, a condenser and an evaporator, in which refrigerant discharged from the compressor is circulated through the condenser and the evaporator;
    an intra-chamber temperature sensor provided in the refrigerating chamber and configured to detect a temperature in the refrigerating chamber;
    a generator which is driven by the engine;
    a connection terminal that can be connected to a commercial power supply;
    a rectifying circuit for rectifying an output of the generator and power supplied to the connection terminal;
    a storage battery unit which is recharged with the output of the generator;
    a switching circuit for converting an output of the rectifying circuit and power of the storage battery unit to power for driving the compressor;
    a first switch provided in a current path between the generator and the rectifying circuit;
    a second switch provided in a current path between the connection terminal and the rectifying circuit;
    a third switch provided in a current path between the storage battery unit and the switching circuit;
    a first operation switch which start and stop the engine;
    a second operation switch which supplies the power of the storage battery unit to drive the compressor; a power supply for the controller,
    which outputs power necessary for driving the controller; and
    a controller having detecting means for detecting whether the generator outputs power and whether power is supplied to the connection terminal, twenty-first control means for controlling the switches in accordance with the fact detected by the detecting means and the operation of the second operation switch thereby to selectively perform a generator-driving mode operation of driving the compressor with the output of the generator, a commercial power mode operation of driving the compressor with power of the commercial power supply, an idling-stop mode operation of driving the compressor with the power of the storage battery unit and an automatic mode operation of changing the operating mode to the idling-stop mode after the generator-driving mode operation and the commercial power mode operation are terminated;

a twenty-second control means for controlling the switching circuit and an output frequency of the switching circuit in accordance with the temperature detected by the intra-chamber temperature sensor; and a twenty-third control means for forming a power-supplying path extending from the power supply to the controller, when the first operation switch or the second operation switch is turned on, and for maintaining the power-supplying path until a preset time elapses after each mode operation is terminated.

14. An apparatus according to claim 13, wherein the controller further has a nonvolatile data storage unit and twenty-fourth control means which stores control data about the control that the controller has performed, into the nonvolatile data storage unit when the preset time for the twenty-third control means elapses.

15. An apparatus according to claim 13, wherein the controller has a twenty-fifth control means, which performs a pressure balance control to balance refrigerant pressures at high- and low-pressure sides of the refrigerating cycle during the preset time the twenty-third control means elapses.

16. An apparatus according to claim 13, wherein the controller further has a twenty-sixth control means, which lowers the output frequency of the switching circuit to a preset value when the power supply for the switching circuit is switched, in spite of the control performed by the twenty-second control means.

17. An apparatus according to claim 13, wherein the twenty-second control means controls the switching circuit in accordance with the temperature detected by the intra-chamber temperature sensor, controls the output voltage and output frequency of the switching circuit and switches a control pattern of the output voltage and output frequency in accordance with whether the power supply of the switching circuit is the generator, the commercial power supply or the storage battery unit, and the controller further has twenty-sixth control means and twenty-seventh control means, said twenty-sixth control means being designed to lower the output frequency of the switching circuit to a preset value when the power supply for the switching circuit is switched, in spite of the control performed by the twenty-second control means, and said twenty-seventh control means being designed to change the output voltage of the switching circuit so that the output frequency of the switching circuit may remains at the preset value when the twenty-sixth control means lowers the output frequency of the switching circuit, though the control pattern of the twenty-second control means is switched.

18. An apparatus according to claim 13, wherein the twenty-second control means renders the rate of changing the output frequency of the switching circuit faster when the power supply for the switching circuit is the generator than when the power supply for the switching circuit is the commercial power supply or the storage battery unit.

19. An apparatus according to claim 13, further comprising:

a third operation switch which is configured to set a recharging mode to recharge the storage battery unit; and a twenty-eighth control means provided in the controller, for stopping the switching circuit when the third operation switch sets the recharging mode while the first switch or the second switch remains closed.

20. An apparatus according to claim 13, wherein the power supply for the controller is a vehicle battery provided in the vehicle or the storage battery unit.

* * * * *